United States Patent [19]
Aboud et al.

[11] Patent Number: 6,095,273
[45] Date of Patent: Aug. 1, 2000

[54] VEHICLE INSTRUMENT PANEL WITH MOVABLE PODS HAVING FORE AND AFT AIRBAGS

[75] Inventors: George Aboud, Northville; Jason Baldas, Warren, both of Mich.

[73] Assignee: Lear Corporation, Southfield, Mich.

[21] Appl. No.: 09/258,241

[22] Filed: Feb. 26, 1999

[51] Int. Cl.[7] .......................... B60K 37/00; B60K 21/16
[52] U.S. Cl. .......................... 180/90; 280/731; 280/732; 280/752; 296/70
[58] Field of Search .................. 280/728.1, 731, 280/732, 752, 748, 751, 750; 180/90; 296/70, 72

[56] References Cited

U.S. PATENT DOCUMENTS

| | | |
|---|---|---|
| 3,801,126 | 4/1974 | Knight, IV et al. .................. 280/732 |
| 3,876,228 | 4/1975 | Hawkins et al. ........................ 280/752 |
| 3,924,707 | 12/1975 | Renner et al. ............................ 180/90 |
| 3,992,070 | 11/1976 | Dunn et al. . |
| 4,372,410 | 2/1983 | Loken et al. . |
| 5,261,502 | 11/1993 | Kronholm, Jr. . |
| 5,425,549 | 6/1995 | Oda . |

Primary Examiner—Peter C. English
Assistant Examiner—Lynda Jasmin
Attorney, Agent, or Firm—Brooks & Kushman P.C.

[57] ABSTRACT

A vehicle instrument panel assembly includes a vehicle console with first and second movable instrument panel pods positioned on opposing sides of the console. Each pod is independently movable in forward and rearward directions with respect to the console. Each pod includes a first airbag positioned at a forward side thereof and a second airbag positioned at a rearward side thereof for improved energy management.

7 Claims, 3 Drawing Sheets

6,095,273

VEHICLE INSTRUMENT PANEL WITH MOVABLE PODS HAVING FORE AND AFT AIRBAGS

TECHNICAL FIELD

The present invention relates to a vehicle instrument panel assembly including first and second independently movable instrument panel pods which are movable fore and aft in the vehicle, wherein each pod includes an airbag positioned at forward and rearward sides thereof.

BACKGROUND ART

Many current vehicle designs include an airbag mounted to the instrument panel for deployment adjacent vehicle occupants.

It is desirable to provide an improved instrument panel assembly in which energy management capability is improved, particularly for high energy crashes.

DISCLOSURE OF INVENTION

The present invention provides an improved vehicle instrument panel safety system by providing a console having first and second movable instrument panel pods on opposite sides thereof, wherein the instrument panel pods are movable forward and rearward in the vehicle, and each pod includes an airbag on a forward and rearward side thereof for improved energy management.

More specifically, the present invention provides a vehicle including a vehicle console and first and second movable instrument panel pods positioned on opposing sides of the vehicle console. Each pod is independently movable forward and rearward in the vehicle. Each pod includes a first airbag positioned at a forward side thereof and a second airbag positioned at a rearward side thereof.

Each first airbag may be mounted to the movable pod or to the firewall in front of the movable pod. Alternatively, each first airbag may be mounted to the vehicle body at any location between the pod and the forward part of the occupant cabin.

The airbags at the forward side of the movable pods are particularly useful in high energy crash situations for dissipating crash loads during frontal and frontal offset crashes.

Accordingly, an object of the invention is to provide a vehicle instrument panel assembly with improved energy absorption characteristics.

Another object of the invention is to provide a vehicle instrument panel assembly with independently movable pods having airbags at forward and rearward sides thereof for improved energy management.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
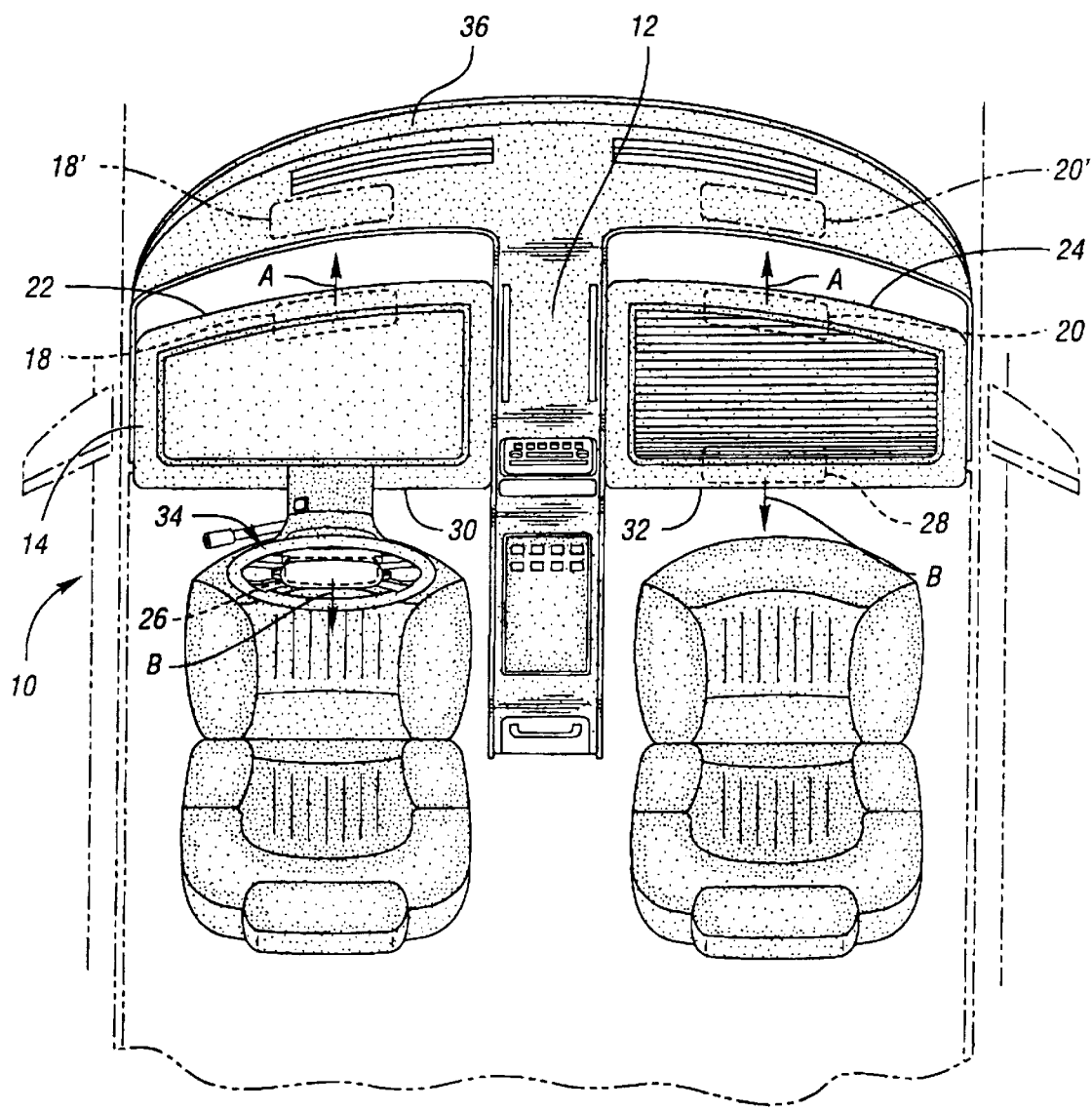
FIG. 1 shows a schematic overhead plan view of a vehicle assembly in accordance with the present invention.
Figure 2:
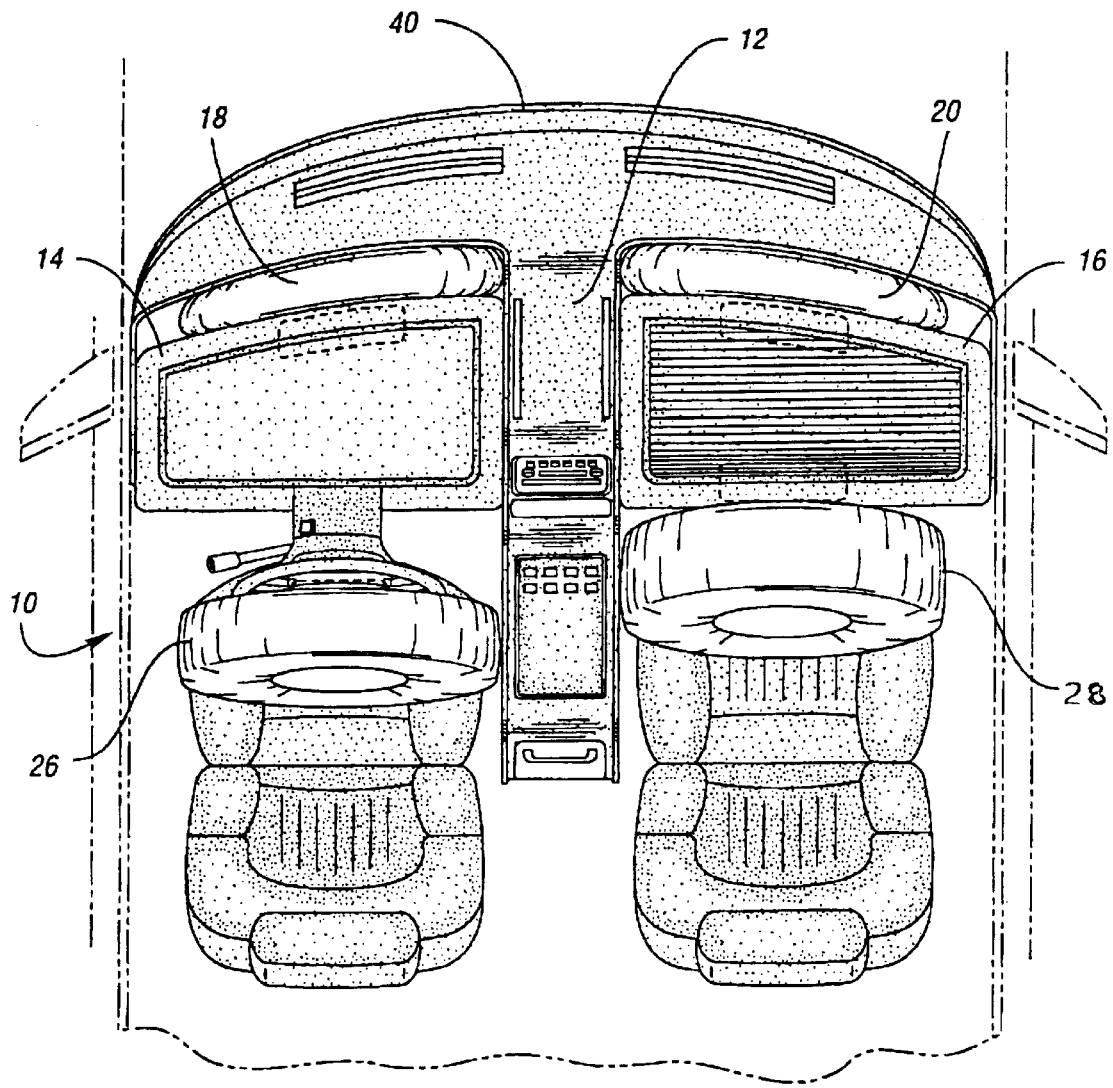
FIG. 2 shows a schematic overhead plan view of the vehicle assembly of FIG. 1 with the airbags deployed.
Figure 3:
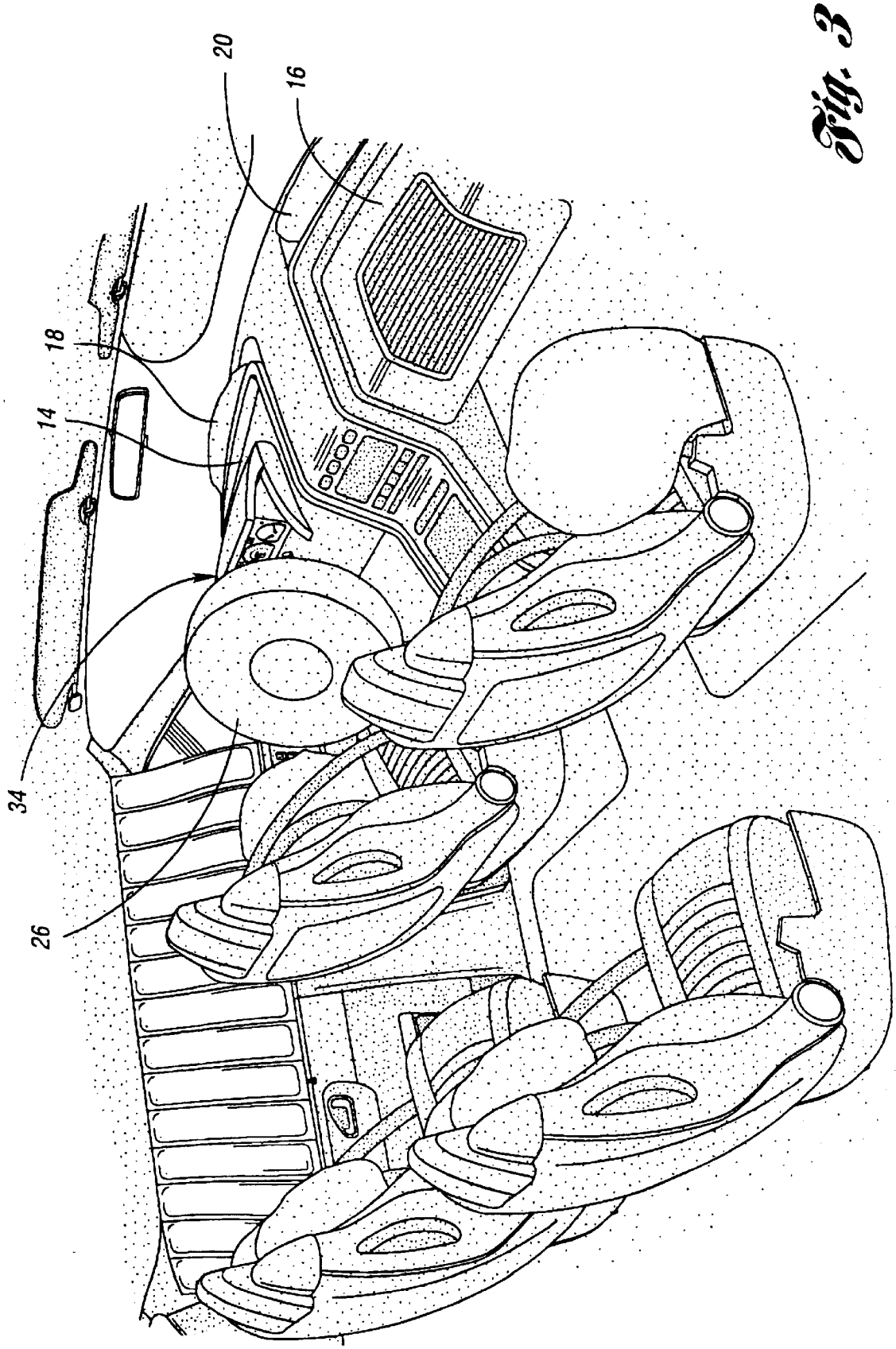
FIG. 3 shows a perspective view a vehicle assembly in accordance with the present invention.

Referring to FIGS. 1–3, a vehicle assembly 10 is shown in accordance with the present invention. As shown, the vehicle assembly 10 includes a console 12 having independently movable instrument panel pods 14,16 positioned at opposing sides thereof. The instrument panel pods 14,16 are preferably slidably mounted on tracks for movement in forward and rearward directions (A,B) in the vehicle, as illustrated in FIG. 1.

Accordingly, the first and second instrument panel pods 14,16 are independently movable in forward and rearward directions (A,B) in the vehicle for selective adjustment by the driver and passenger. A first airbag 18,20 is positioned on the forward side 22,24 of each movable instrument panel pod 14,16. Additionally, a second airbag 26,28 is positioned on the rearward side 30,32 of each instrument panel pod 14,16. The airbag 26 is positioned on a steering wheel assembly 34, and airbag 28 is positioned within the movable pod 16. Accordingly, airbags 26,28 are deployable in the direction of vehicle occupants upon impact.

Additionally, each first airbag 18,20 is positioned for deployment between the respective instrument panel pod 14,16 and the firewall 36.

The deployed airbags 18, 20, 26, 28 are shown in FIG. 2. As shown, the first airbags 18,20 are deployed between the respective instrument panel pod 14,16 and the firewall 36 to cushion the instrument panel pod with respect to the forward part 40 of the occupant cabin.

The first airbags 18,20 are particularly useful for energy management during frontal and frontal offset crashes. The airbags 26,28 in front of each seat occupant operate based on crash severity and impact direction (i.e., frontal and frontal offset crashes). The time differential between deployment of airbags 26,28 and airbags 18,20 is a function of crash severity. If the crash severity is low, the time differential between deployment of airbags 26,28 and airbags 18,20 will be longer than in a more severe crash situation.

This invention has the added benefit of allowing the second airbags 26,28 to be depowered significantly to provide soft engagement with the vehicle occupants, while the first airbags 18,20 can deploy more aggressively, thereby providing the opportunity for optimal energy dissipation ride-down.

The instrument panel pods 14,16 are preferably cantilevered, and the first airbags 18,20 provide improved energy management which reduces the structural requirements of the instrument panel assembly and eliminates the need for knee impact plates in the instrument panel, thereby reducing cost and weight of the assembly.

As shown in FIG. 1, the first airbags 18,20 may be positioned in the firewall 36 at locations 18',20' for deployment in a direction toward the respective movable instrument panel pod 14,16. Alternatively, the first airbags 18,20 could be mounted on any body component forward of the instrument panel pods 14,16.

While the best modes for carrying out the invention have been described in detail, those familiar with the art to which this invention relates will recognize various alternative designs and embodiments for practicing the invention within the scope of the appended claims.

What is claimed is:

1. A vehicle comprising:

a vehicle console;

first and second movable instrument panel pods positioned on opposing sides of the vehicle console, each said pod being independently movable forward and rearward in the vehicle; and wherein each said pod includes a first airbag positioned at a forward side thereof and a second airbag positioned at rearward side thereof.

2. The vehicle of claim 1, wherein each said first airbag is mounted to the forward side of the respective pod.

3. The vehicle of claim 1, further comprising a firewall positioned in the vehicle forward of said first and second movable instrument panel pods, and wherein each said first airbag is mounted to the firewall.

4. A vehicle instrument panel assembly comprising:

a vehicle console;

first and second movable instrument panel pods positioned on opposing sides of the vehicle console, each said pod being independently movable in forward and rearward directions with respect to the vehicle console; and wherein each said pod includes a first airbag positioned at a forward side thereof and a second airbag positioned at a rearward side thereof.

5. A vehicle comprising:

a vehicle console;

first and second movable instrument panel pods positioned on opposing sides of the vehicle console, each said pod being independently movable forward and rearward in the vehicle; and wherein each said pod includes a first airbag positioned at a forward side thereof and at least one of said pods includes a second airbag positioned at a rearward side thereof.

6. The vehicle of claim 5, wherein each said first airbag is mounted to the forward side of the respective pod.

7. The vehicle of claim 5, further comprising a firewall positioned in the vehicle forward of said first and second movable instrument panel pods, and wherein each said first airbag is mounted to the firewall.

* * * * *